Nov. 29, 1960     H. R. GREENLEE     2,962,195
PRESSURE VESSEL
Filed March 11, 1955     2 Sheets-Sheet 2
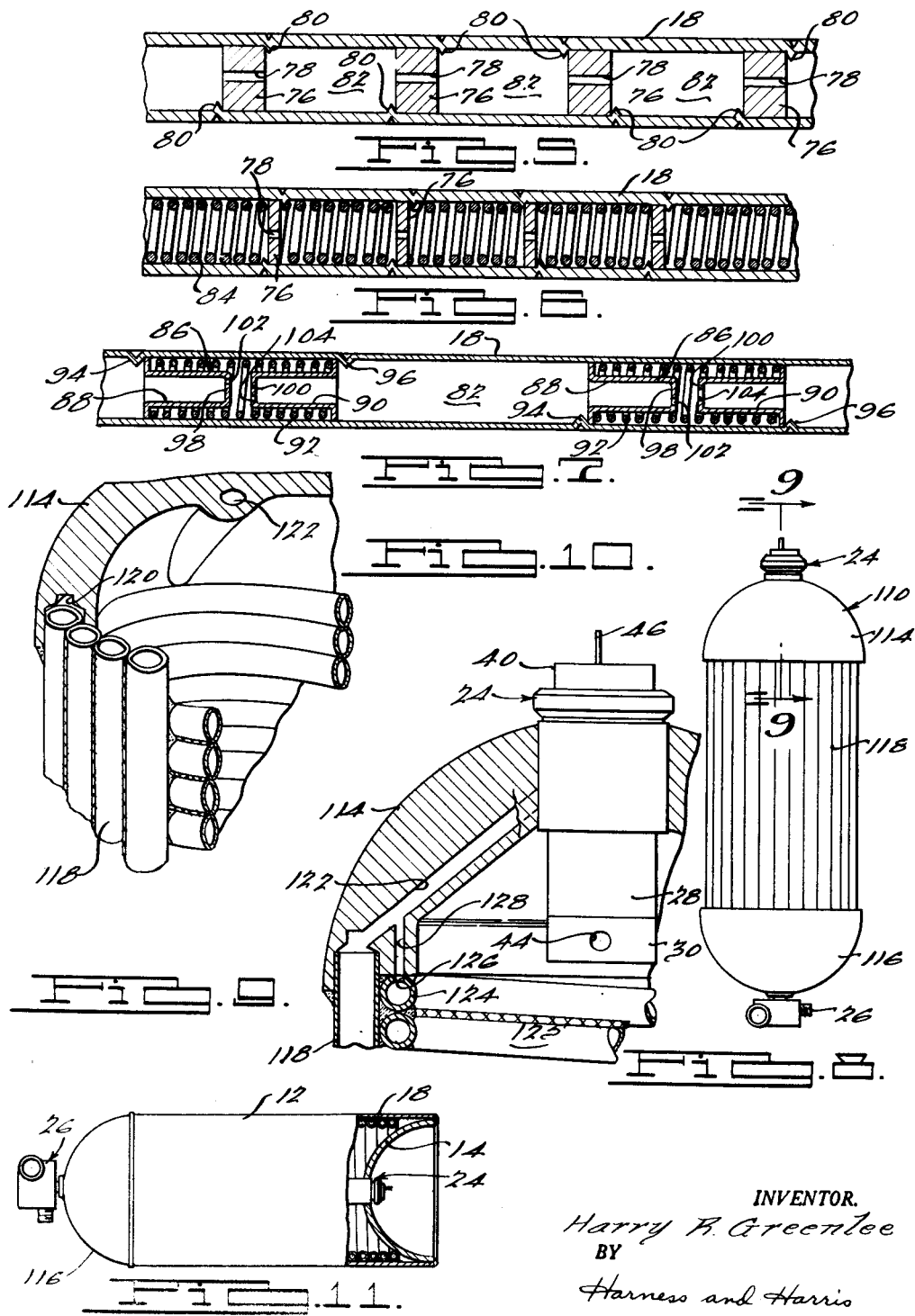
INVENTOR.
Harry R. Greenlee
BY
Harness and Harris
ATTORNEYS

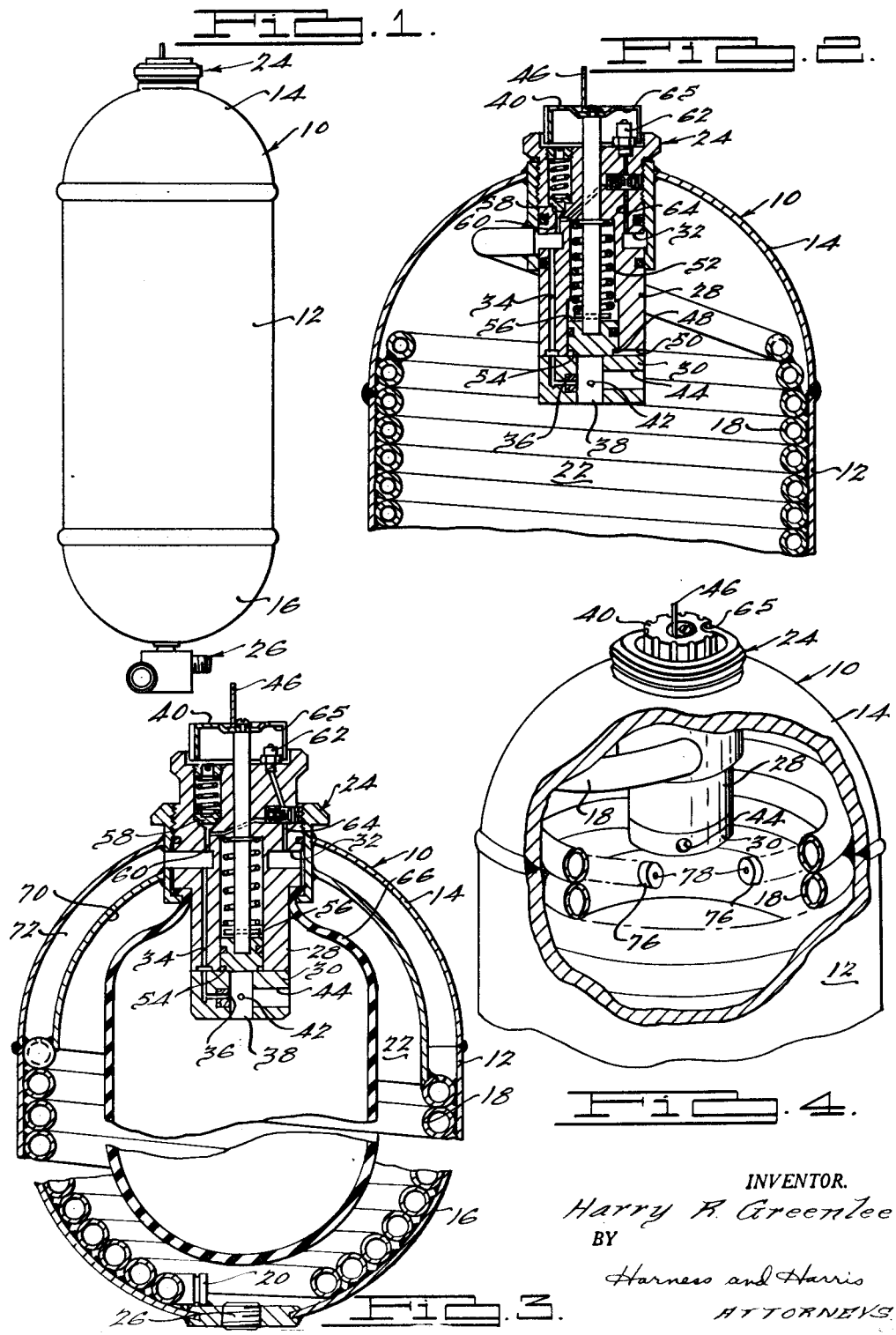

United States Patent Office 2,962,195
Patented Nov. 29, 1960

2,962,195

PRESSURE VESSEL

Harry R. Greenlee, Detroit, Mich., assignor to Chrysler Corporation, Highland Park, Mich., a corporation of Delaware Filed Mar. 11, 1955, Ser. No. 493,590

8 Claims. (Cl. 222—394)

This invention relates to an improved pressure vessel of the type utilizing tubing as a container for fluid under pressure.

Pressure vessels of the type to be described herein have many applications and they are particularly adapted for use in situations where it is desired to expel a fluid from the pressure vessel by means of the same or a different fluid, a supply of the latter fluid being retained under even higher pressure in tubing carried within the pressure vessel. Oxygen tanks, fire extinguishing equipment, flame throwers, garden or tree spraying devices and paint and insect spray devices are a few of the many applications of devices of this type.

The pressure vessel to be described herein is also particularly adapted for use where non shattering characteristics are desirable. For example, oxygen tanks in military installations such as aircraft require that a minimum of shattering of the pressure vessel occur as an incident to rupture of the vessel by shell fire.

It is also desirable where inflammable fluids, or fluids such as oxygen, that support combustion are contained within the pressure vessel that means be provided to minimize the fire hazard and it is a further object of this invention to provide means for minimizing such combustion.

It is also an object of this invention to provide an extremely light weight pressure vessel with a minimum of exposed valving and plumbing.

The inclusion of tubing within a pressure vessel for the dual purpose of giving structural strength to the pressure vessel while providing a storage container for extremely high pressure fluid is disclosed in my copending application Serial No. 467,911, which was filed November 10, 1954. It is one object of this invention to provide an improved construction in which the wall structure of a pressure vessel consists of a plurality of parallel lengths of tubing which are bonded to each other throughout their length and a layer of tubing coiled in abutting relationship with said parallel lengths of tubes. This construction provides a container of minimum weight and maximum strength.

It is also an object of the invention to utilize dissimilar metals for the wall forming tubing and the brazing material used for bonding portions of the tubing together. The use of dissimilar materials minimizes shattering where the brazing material is more ductile than the material being brazed and the brazing material thus acts as a dampening medium.

The use of tubing as a storage container for high pressure fluid tends to minimize shattering when the vessel is ruptured by shell fire or accident for great quantities of fluid cannot be discharged fast enough from the tubing to cause shattering. A further device for minimizing shattering is described herein in connection with placing plugs at spaced intervals in the tubing wherein the plugs are provided with a metering orifice to further limit the ability of the fluid contained within the tubing to escape rapidly in the event of rupture of the vessel.

Referring to the drawings:

Fig. 1 is a side elevational view of a cylindrical pressure vessel;

Fig. 2 is a vertical section of the upper end of the pressure vessel illustrated in Fig. 1;

Fig. 3 is a fragmentary vertical section of a modified form of pressure vessel;

Fig. 4 is a fragmentary perspective view of the upper portion of the pressure vessel in Fig. 1 showing the use of spaced plugs in the pressure tubing;

Fig. 5 is a vertical section of a piece of tubing containing spaced plugs;

Fig. 6 is a vertical section of a piece of tubing showing a modified form of installation of spaced plugs;

Fig. 7 is a vertical section of a piece of tubing showing a modified form of pressure reducing means contained within the tubing;

Fig. 8 illustrates a modified form of pressure vessel;

Fig. 9 is a partial vertical section of the upper end of the pressure vessel taken on the line 9—9 of Fig. 8;

Fig. 10 is a partial perspective view of a portion of the upper end of a pressure vessel illustrated in Fig. 8; and Fig. 11 illustrates a modified pressure vessel construction.

A pressure vessel 10 illustrated in Fig. 1 is formed with a generally cylindrical shaped wall structure 12 capped by upper and lower headers 14 and 16, each of which is welded to the wall structure 12.

A length of tubing 18 is capped at one end as illustrated at 20 in Fig. 3 and coiled within the pressure vessel in a generally helical pattern, as illustrated in Fig. 2. The wall structure 12 and tubing 18 are illustrated as made of metal although other substances such as various well known plastics could be used in some applications of the invention. Each ring of tubing 18 is integrally bonded to its adjacent rings and to the wall structure 12 so that the tubing, in addition to providing a storage compartment for pressure fluid, serves to strengthen the wall structure 12. The tubing 18 and wall structure 12 cooperate to form the effective wall structure for the pressure tank 10 and they cooperate to form an internal cavity 22 of generally cylindrical shape.

A fitting 24 including a pressure regulating device is illustrated as installed in the upper header 14 of the pressure vessel 10. This pressure regulating device controls the discharge of high pressure fluid from tubing 18 to the internal cavity 22 of pressure vessel 10 which contains a fluid to be expelled from the pressure vessel. Similarly, a discharge fitting 26 is illustrated in Fig. 1 as carried by the lower header 16 of the pressure vessel 10.

The pressure regulating device includes body members 28 and 30. The body member 28 has circumferential passage 32 which is in fluid flow communication with one end of the helically coiled tubing 18 so that fluid under pressure in the tubing 18 is admitted to the passage 32. Fluid under pressure which is admitted to the circumferential passage 32 travels longitudinally of the body members 28 and 30 in a passage 34 which is formed therein and which is in fluid flow communication with a passage 36 formed in body member 30. Passage 36 is normally blocked by a valve stem 38 which is rotatably mounted within the body members 28 and 30. The valve stem 38 can be turned by the operator by manipulation of a control knob 40 and when the valve stem 38 is rotated 90° a transverse opening 42 which extends laterally therethrough is aligned with passage 36 so that fluid is admitted to the internal cavity 22 of the pressure vessel through a passage 44 provided in body member 30. There is thus provided a manual means of selectively admitting fluid under pressure to the internal cavity 22 of the pressure vessel. A member 46 is preferably carried by control knob 40 to indicate the position of valve stem 38 by weight or touch.

In addition to a manual control for selectively admitting air under pressure to the internal cavity 22 it is desirable to provide means for regulating the admission of fluid so that a predetermined fluid pressure may be maintained in the internal cavity 22. To this end the valve stem 38 is mounted in body members 28 and 30 for axial movement under the influence of fluid pressure which is admitted to the space below an enlarged portion 48 on the valve stem through a passage 50 provided in the body member 28. A spring 52 is provided in the body member 28 to oppose movement of the valve stem and if, for example, the fluid in tubing 18 is under a pressure of about 2000 lbs. per square inch and if the spring 52 is preselected so that it will yield and accommodate axial movement of the valve stem when about 400 lbs. per square inch of pressure is present in the internal cavity 22 than when a pressure in excess of 400 lbs. per square inch exists in cavity 22 the valve stem will move axially until the opening 42 in the valve stem is no longer in fluid flow communication with the passage 36 and the admission of fluid under pressure from tubing 18 to the internal cavity 22 is interrupted. However, should pressure within the internal cavity 22 drop below the preselected value of the spring 52, the valve stem will be axially returned by the spring 52 and if the valve stem is in the proper rotary position the opening 42 will be aligned with the passage 36. Additional fluid will then be admitted under a pressure of 2000 lbs. per square inch from the tubing 18 to the internal cavity 22 until the pressure in cavity 22 exceeds 400 lbs. per square inch. Suitable abutments 54 and 56 are provided on the valve stem to limit the axial movement thereof. A conventional pressure relief valve is provided at 58 to limit the pressure in tubing 18 to a predetermined maximum value and this valve is in fluid flow communication with the circumferential passage 32 through a passage 60 in body member 28.

A valve 62 which resembles a heavy duty valve used on automobile tires is provided on body member 28 and is connected to the circumferential passage 32 by means of a passage 64. An opening 65 is provided in control knob 40 to provide access to valve 62. A suitable source of fluid under pressure may be connected to valve 62 and the tubing 18 filled with fluid to a predetermined pressure, such as 2000 lbs. per square inch, established by relief valve 58.

The fitting 26 which is illustrated as carried by the lower header 16 may incorporate any conventional type of valve to control the discharge of fluid from cavity 22 to the outside of the pressure vessel. The particular valve which is illustrated in Fig. 1 is a conventional "oxygen-on-demand" type of valve frequently used with oxygen tanks.

In Fig. 3 a modification of the device incorporating a flexible bag is illustrated. In this modification a flexible bag 66 depends from and is connected to the pressure regulating device 24 so that when fluid is admitted to the interior of the flexible bag 66 from the tubing 18 and passage 44 the bag is extended from a first relaxed condition, illustrated in Fig. 3, to a second extended condition in which it substantially fills the internal cavity 22 thereby expelling fluid from the pressure vessel 10 through fitting 26.

In the device illustrated in Fig. 3 there is a further departure from the construction illustrated in Fig. 2 in that the upper header 14' of Fig. 3 carries a manifold member 70 which is spaced inwardly from header 14' to define a manifold 72 and the tubing 18 is welded to the header 14', wall structure 12 and manifold member 70 and fluid under pressure from the tubing 18 is conducted to passage 32 of pressure regulating device 24 by the manifold 72.

The use of tubing, as described above which is wound and brazed to itself and to the wall structure 12 minimizes shattering of the pressure vessel when the vessel is ruptured as by shell fire, due to the fact that the relatively small cross section of the tubing restricts the escape of high pressure fluid at the point of rupture and a great quantity of fluid under pressure cannot suddenly be discharged. The restricted escape of pressure fluid does not shatter the vessel as might be the case if the entire quantity of fluid tried to escape through the rupture at once.

In an effort to further improve shattering characteristics a refinement of the device is shown herein. Referring to Fig. 4 the tubing 18 is illustrated as coiled within the pressure vessel 10 in the manner described above in connection with Fig. 2, and in addition, a plurality of small plugs 76 are provided at spaced intervals throughout the length of the tubing 18. Each of the plugs 76 has a small metering orifice 78 provided in it. The plugs may be staked or brazed in the tube as illustrated in Fig. 5 at 80. The plugs 76 are spaced so as to define a plurality of fluid storage compartments or chambers 82 which are arranged in series relationship and interconnected by the metering orifices 78. The metering orifices 78 provide the means for communicating fluid between adjacent compartments 82 in the storing and discharging of fluid from the tubing 18. The size of the metering orifices is determined by the rate at which escape of the fluid is generally required in the normal use of the pressure vessel and this required rate of escape is usually considerably less than that offered by use of the entire tube without plugs 76. It is desirable to use large tubing with these plugs in it in preference to using a capillary tubing of small diameter because excessive lengths of the capillary tubing would be required to obtain the desired storage capacity for pressure fluid and this would introduce weight and manufacturing problems.

If the tubing 18 was ruptured by shell fire in any one of the compartments 82, after the initial escape of the small quantity of fluid contained in that particular compartment 82 any further fluid escaping from the rupture would be at a very reduced pressure and the quantity of fluid escaping in a given period of time would similarly be reduced for the only fluid that can get to the ruptured area must come through metering orifices 78 from the adjacent compartments. The chances for shattering the pressure vessel are thus greatly reduced.

When combustible fluids or fluids that support combustion are stored under pressure in the tubing 18 the plugs 76 possess another desirable characteristic in that they impair the supply of fluid so that the tendency of the fluid to support combustion is minimized.

In Fig. 6 a slightly modified form of structure is illustrated in which the plugs are located at predetermined intervals by means of spacers 84, which are illustrated in this case, as springs 84. In the assembly of the device a plug 76 may be dropped into the tubing and staked or brazed in place and then a spring 84 or other spacers may be dropped in followed in alternate succession by other springs and plugs. The operation of this form of the device is the same as that illustrated in connection with Fig. 5.

In Fig. 7 a modified form of device is illustrated in which spaced normally open metering valves are used instead of plugs 76. Each metering valve 86 includes first and second relatively movable cups 88 and 90 which are urged away from each other by a spring 92 towards abutments 94 and 96 which may be provided by staking the tube 18. The cups 88 and 90 respectively carry faces 98 and 100 which are adapted to abut when they are subjected to sufficient differential in pressure to overcome spring 92. The faces 98 and 100 are illustrated as respectively provided with openings 102 and 104 which do not register when the faces 98 and 100 abut. In addition to the metering effect provided by the small orifices 102 and 104 the escape of fluid from one compartment 82 to another compartment is opposed by closing of the metering valve 86. The tubing 18, may, of course, be filled without closing the valve 86 for if the fluid is admitted to the tubing 18 sufficiently gradually so that the spring 92 is not overcome by pressure differential between adjacent compartments the valve 86 will not be closed. Similarly the springs 92, are preselected so that they will not collapse at the normal rate of use of the pressure fluid although they will collapse when the tubing is ruptured and a maximum pressure differential exists between adjacent compartments.

In Fig. 8 a modified form of pressure vessel 110 is illustrated as including header 114 and 116 respectively provided with a pressure reducing valve 24 and a discharge fixture 26 as discussed above in connection with Fig. 1. The pressure vessel of Fig. 8 differs from that of Fig. 1 in that the wall structure 12 illustrated in Figs. 1 and 2 has been omitted and a plurality of parallel lengths of tubing 118 have been substituted therefor.

Figs. 9 and 10 are further showings of the device in Fig. 8 and it will be noted that the header 114 is provided with a circumferential manifold 120 in communication with the open ends of the lengths of tubing 118. A similar manifold is preferably provided in the header 116 in communication with the lower ends of the lengths of tubing 118 although it is not illustrated in the drawing for it is a mere reversal of the showing in Fig. 10. If desired, the lower end of tubes 118 could be plugged. The lengths of tubing 118 are bonded to each other throughout their length and to the header 114. The manifold 120 in the header 114 is in fluid flow communication with the passage 32 of the pressure reducing valve 24 by means of a passage 122 provided in the header 114.

A layer of tubing 124 which roughly corresponds to the tubing 118 of Fig. 2 is coiled in abutting relationship with the parallel lengths of tubing over substantially the entire surface of the inside of the lengths of tubing 118 of the pressure vessel 110 and defines an internal cavity 125. Abutting rings of the coil tubing are integrally bonded to each other throughout their length and they are bonded to the lengths of tubing 118. The coiled tubing 124 is provided with a fluid flow communication between its upper turn and the passage 122 by means of an aperture 126 in the tubing 124 and a registering passage 128 in the header 114. If desired, a pressure regulating valve such as that illustrated in Fig. 2 may be used to interconnect tubing 124 and manifold 120 thereby accommodating the storage at different pressures in tubing 118 and tubing 124.

The substitution of tubing 118 for the wall structure 12 of Fig. 2 provides additional storage capacity for fluid under pressure at no sacrifice in weight or axial strength of the pressure vessel. As explained on page 54 of the text book "Elements of Strengths of Materials" by Timoshenko the axial stress in a closed tube is one-half the circumferential stress and this concept has been utilized in creating the pressure vessel illustrated in Figs. 8 and 10. The excess available axial strength of the tubing has been used by relying on the axial strength of the coiled tubing 18 or 124 to prevent the side walls of the container from bulging outwardly and the available axial strength of tubing 118 has been used to hold the headers 114 and 116 on.

Fig. 11 illustrates the application of a common practice to the pressure vessel of Fig. 1 in that the header 14 has been inverted so that it forms a concave end on the pressure vessel rather than a convex end. This has been illustrated merely to show that such a departure from the illustration in Fig. 1 is within the scope of this invention and that either one or both headers may be installed so that they present a concave outer surface if desired.

I claim:

1. A pressure tank comprising side wall structure and first and second end headers cooperating to define a closed container, said side wall structure comprising a plurality of parallel lengths of tubing extending from said first header to said second header, said pressure tank further including a layer of tubing coiled in abutting relationship with said parallel lengths of tubing over substantially the entire surface of one side of said wall structure, said first and second headers each being integrally bonded to said wall structure and one of said headers including means defining a manifold receiving the open ends of said parallel lengths of tubing and providing a fluid flow connection between said manifold and one end of said coiled tubing, pressure regulating means to accommodate the controlled discharge of fluid from within said tubing to the interior of said container and fitting means to accommodate the discharge of fluid from said container to the exterior thereof.

2. A pressure tank comprising side wall structure and first and second end headers cooperating to define a closed container, said side wall structure comprising a plurality of parallel lengths of tubing extending from said first header to said second header and adjacent lengths of said tubing being integrally bonded to each other throughout their length, said pressure tank further including a layer of tubing coiled in abutting relationship with said parallel lengths of tubing over substantially the entire surface of one side of said wall structure, said coiled tubing throughout a major portion of its length being integrally bonded to said one side of said wall structure and adjacent, abutting rings of said coiled tubing being integrally bonded to each other throughout a major portion of their length so that the structural strength of said bonded rings of tubing contribute to the ability of the container to withstand pressure from within said container, said first and second headers each being integrally bonded to said wall structure and one of said headers including means defining a manifold receiving the open ends of said parallel lengths of tubing and providing a fluid flow connection between said manifold and one end of said coiled tubing, pressure regulating means to accommodate the controlled discharge of fluid from within said tubing to the interior of said container and fitting means to accommodate the discharge of fluid from said container to the exterior thereof.

3. A pressure tank comprising side wall structure and first and second end headers cooperating to define a closed cylindrical container, said side wall structure comprising a plurality of straight lengths of tubing each extending from said first header to said second header in a direction parallel to the axis of said cylindrical container, adjacent lengths of said tubing being integrally bonded to each other throughout their length, said pressure tank further including a layer of tubing coiled in abutting relationship with said parallel lengths of tubing over substantially the entire surface area of one side of said wall structure, said coiled tubing throughout a major portion of its length being integrally bonded to said one side of said wall structure and adjacent, abutting rings of said coiled tubing being integrally bonded to each other throughout a major portion of their length so that the structural strength of said bonded rings of tubing contribute to the ability of the container to withstand pressure from within said container, said first and second headers each being integrally bonded to said lengths of parallel tubing and one of said headers including means defining a manifold communicating with the open ends of said parallel lengths of tubing and providing a fluid flow connection between said manifold and one end of said coiled tubing, pressure regulating means to accommodate the controlled discharge of fluid from within said tubing to the interior of said container and fitting means to accommodate the discharge of fluid from said container to the exterior thereof.

4. A pressure tank comprising side wall structure and first and second end headers cooperating to define a closed container, said side wall structure comprising a plurality of parallel lengths of tubing extending from said first header to said second header and adjacent lengths of said tubing being integrally bonded to each other throughout their length, said side wall structure further including a layer of tubing coiled in abutting relationship with said parallel lengths of tubing over substantially the entire inner surface of said parallel lengths of tubing, said coiled tubing throughout a major portion of its length being integrally bonded to said parallel lengths of tubing and adjacent, abutting rings of said coiled tubing being integrally bonded to each other throughout a major portion of their length so that the structural strength of said bonded rings of tubing contribute to the ability of the container to withstand pressure from within said container, said first and second headers each being integrally bonded to said parallel lengths of tubing and one of said headers including means defining a manifold communicating with the open ends of said parallel lengths of tubing and providing a fluid flow connection between said manifold and one end of said coiled tubing, pressure regulating means to accommodate the controlled discharge of fluid from within said tubing to the interior of said container and fitting means to accommodate the discharge of fluid from said container to the exterior thereof.

5. A pressure tank comprising side wall structure and first and second end headers cooperating to define a closed cylindrical container, said side wall structure including a first tubing structure comprising a plurality of parallel lengths of tubing extending from said first header to said second header with adjacent lengths of said tubing integrally bonded to each other throughout their length, said side wall structure further including a second tubing structure comprising a layer of tubing coiled in abutting relationship with said parallel lengths of tubing over substantially the entire inner surface of said parallel lengths of tubing, said coiled tubing throughout a major portion of its length being integrally bonded to said one side of said parallel lengths of tubing and adjacent, abutting rings of said coiled tubing being integrally bonded to each other throughout a major portion of their length so that the structural strength of said bonded rings of tubing contribute to the ability of the container to withstand pressure from within said container, said first and second headers each being integrally bonded to one of said tubing structures and one of said headers including means defining a manifold communicating with the open ends of said parallel lengths of tubing and providing a fluid flow connection between said manifold and one end of said coiled tubing, pressure regulating means to accommodate the controlled discharge of fluid from within said tubing to the interior of said container and fitting means to accommodate the discharge of fluid from said container to the exterior thereof.

6. A pressure tank comprising side wall structure and first and second end headers cooperating to define a closed cylindrical container, said side wall structure comprising a plurality of parallel lengths of tubing extending from said first header to said second header and adjacent lengths of said tubing being integrally bonded to each other throughout their length, said side wall structure further including a layer of tubing coiled in abutting relationship with said parallel lengths of tubing over substantially the entire inner surface of said parallel lengths of tubing, adjacent, abutting rings of said coiled tubing being integrally bonded to each other throughout a major portion of their length so that the structural strength of said bonded rings of tubing contribute to the ability of the container to withstand pressure from within said container, said first and second headers each being integrally bonded to said parallel lengths of tubing and one of said headers including means defining a manifold communicating with the open ends of said parallel lengths of tubing and providing a fluid flow connection between said manifold and one end of said coiled tubing, pressure regulating means to accommodate the controlled discharge of fluid from within said tubing to the interior of said container and fitting means to accommodate the discharge of fluid from said container to the exterior thereof.

7. A pressure tank comprising side wall structure and first and second end headers cooperating to define a closed container, said side wall structure comprising a plurality of parallel lengths of tubing extending from said first header to said second header and adjacent lengths of said tubing being integrally bonded to each other throughout their length, said side wall structure further including a layer of tubing coiled in abutting relationship with said parallel lengths of tubing over substantially the entire inner surface of said parallel lengths of tubing, said coiled tubing throughout a major portion of its length being integrally bonded to said parallel lengths of tubing and adjacent, abutting rings of said coiled tubing being integrally bonded to each other throughout a major portion of their length so that the structural strength of said bonded rings of tubing contribute to the ability of the container to withstand pressure from within said container, said first and second headers each being integrally bonded to said parallel lengths of tubing and one of said headers including means defining a manifold communicating with the open ends of said parallel lengths of tubing and providing a fluid flow connection between said manifold and one end of said coiled tubing, a plurality of spaced insert elements in each of said lengths of tubing and in said coiled tubing subdividing the interior of said tubing into a plurality of series arranged tubular fluid storage chambers, each of said insert elements being provided with means defining a metering orifice adapted to provide a restricted fluid flow communication between adjacent chambers thereby to restrict the sudden escape of fluid in the event of a localized rupture of said container, pressure regulating means to accommodate the controlled discharge of fluid from within said tubing to the interior of said container and fitting means to accommodate the discharge of fluid from said container to the exterior thereof.

8. A pressure tank comprising side wall structure and first and second end headers cooperating to define a closed cylindrical container, said side wall structure including a first tubing structure comprising a plurality of parallel lengths of tubing extending from said first header to said second header with adjacent lengths of said tubing integrally bonded to each other throughout their length, said side wall structure further including a second tubing structure comprising a layer of tubing coiled in abutting relationship with said parallel lengths of tubing over substantially the entire inner surface of said parallel lengths of tubing, said coiled tubing throughout a major portion of its length being integrally bonded to said one side of said parallel lengths of tubing and adjacent, abutting rings of said coiled tubing being integrally bonded to each other throughout a major portion of their length so that the structural strength of said bonded rings of tubing contribute to the ability of the container to withstand pressure from within said container, said first and second headers each being integrally bonded to one of said tubing structures and one of said headers including means defining a manifold communicating with the open ends of said parallel lengths of tubing and providing a fluid flow connection between said manifold and one end of said coiled tubing, a plurality of spaced insert elements in each of said tubing structures subdividing the interior of said tubing into a plurality of series arranged tubular fluid storage chambers, each of said insert elements being provided with means defining a metering orifice adapted to provide a restricted fluid flow communication between adjacent chambers thereby to restrict the sudden escape of fluid in the event of a localized rupture of said container, pressure regulating means to accommodate the controlled discharge of fluid from within said tubing to the interior of said container and fitting means to accommodate the discharge of fluid from said container to the exterior thereof.

References Cited in the file of this patent

UNITED STATES PATENTS

| | | |
|---|---|---|
| 1,582,192 | Strobell | Apr. 27, 1926 |
| 1,590,513 | Hulse | June 29, 1926 |
| 1,711,270 | Litle | Apr. 30, 1929 |
| 1,947,586 | Fletcher | Feb. 20, 1934 |
| 2,481,662 | Hastings | Sept. 13, 1949 |
| 2,513,455 | Cornelius | July 4, 1950 |
| 2,631,015 | Probst | Mar. 10, 1953 |